United States Patent Office 3,256,208
Patented June 14, 1966

3,256,208
PROCESS FOR PREPARING A Cu-Zn-Cr SYSTEM
CATALYST COMPOSITION
Takashi Eguchi and Tamechika Yamamoto, Niigata-shi, Saburo Yamauchi, Koganei-shi, and Michio Kuraishi and Kazuo Asakawa, Niigata-shi, Japan, assignors to Japan Gas-Chemical Company, Inc., Tokyo, Japan, a corporation of Japan
No Drawing. Filed Apr. 23, 1963, Ser. No. 274,946
Claims priority, application Japan, Apr. 24, 1962, 37/16,559
5 Claims. (Cl. 252—468)

This invention relates to processes for preparing Cu-Zn-Cr system catalysts for the synthesis of methanol from gases containing carbon monoxide and hydrogen. More particularly, this invention relates to a process for preparing Cu-Zn-Cr system catalysts for methanol synthesis which employ a thermally decomposed product of basic cuprammonium chromate as the copper containing component.

Catalysts conventionally employed for the synthesis of methanol from gases containing carbon oxides and hydrogen were of the Zn-Cr or Cu-Zn-Cr systems. The Zn-Cr system catalysts are excellent in heat resistance and durability but their activity is so low that it is practically impossible to use them at low temperatures. The Cu-Zn-Cr system catalysts are poor in heat resistance and durability, but excellent in activity; therefore, they are suitable for methanol synthesis at low temperatures. Various catalysts of the Cu-Zn-Cr system have been proposed relative to improvements of activity, heat resistance and durability. Relative to the starting materials, it has been considered to use copper oxide, zinc oxide, and chromic anhydride as standard catalysts.

We have found that since the conventional catalysts of this type contain a relatively large amount of copper oxide which is weak in mutual action with Zn or Cr, i.e., in the free state, insufficient activity is shown in practice. Moreover, under synthesis conditions, said copper oxide in the free state easily deposits as metallic copper and catalytic activity rapidly decreases. It is an object of the present invention to provide a catalyst, which avoids the aforesaid difficulties.

It is another object of the present invention to provide a process for preparing Cu-Zn-Cr catalysts for methanol synthesis which are effective at reaction conditions of relatively low temperature and low pressure. Another object of the present invention is to provide a process for preparing Cu-6n-Cr catalysts for methanol synthesis which is excellent in activity, resistance and durability.

Further objects and advantages will be understood from the descriptions set forth hereinunder.

According to the present invention, a new type of catalyst of the Cu-Zn-Cr system is provided where a thermally decomposed product of cuprammonium chromate is used as a copper component. The atomic ratio of the three elements in the present catalyst is not critical, but preferably, Cu:Zn:Cr is about 0.4:1.2:1.0.

The present catalyst is prepared by mixing an aqueous chromic acid solution with a material obtained from thermal decomposition of basic cuprammonium chromate and further mixing thereto zinc oxide powders. The thermal decomposition is effected at 250°–700° C., preferably about 300° C., and for about 0.5–3 hours. The zinc oxide powders may be replaced by not only an aqueous zinc oxide paste, but also zinc hydroxide and zinc acetate. After thoroughly kneading to form a homogeneous paste, it is shaped into the form of plates of about 5–6 mm. thick or rods of 5–6 mm. in diameter. Then they are pulverized, after drying, into grain size of 5–6 mm. long. Alternatively, they may be shaped into pellets after being crushed. Then, they are reduced at 170°–450° C., preferably 230°–250° C. under the presence of the reducing gases.

The present catalyst shows excellent activity which can not be expected from conventional catalysts, even at relatively low pressure and temperature, such as at 150 kg./cm.$^2$ and 220° C. The present catalyst is usable at a temperature within the range of 200°–400° C., preferably 250°–350° C. Further, the present catalyst has high mechanical strength. Thus, it has been found that the use of the catalysts of the present invention completely eliminates the drawbacks of copper-containing catalysts, which have heretofore been considered low in particle strength. Also, it has been observed that the present catalysts are less exothermic than the conventional ones, during the methanol synthesis as well as in the reduction step during the manufacture thereof. Furthermore, deformation of the catalyst, i.e., powdering hardly occurs during the methanol synthesis. This is due to the fact that the conventional catalyst produced by mixing copper oxide and zinc oxide with an aqueous chromic acid solution or by adding copper oxide to an aqueous chromic acid solution with zinc oxide added, and its Cr component contains exclusively hexavalent Cr atoms before the reduction treatment. In contrast, Cr atoms present in equimolar amount to copper in the catalyst of the present invention before the reduction are trivalent, and therefore materials to be reduced per unit catalyst weight are very small in amount and reduction proceeds moderately.

The following examples show the superiority of the present catalysts in comparison with the conventional Cu-Zn-Cr catalysts composed of copper oxide, zinc oxide and chromic anhydride.

*Example 1*

75 g. of chromic anhydride was dissolved in 75 cc. of water. To the resulting solution, 78.2 g. of a material obtained by thermal decomposition of basic cuprammonium chromate at 300° C. for one hour was added and the resultant product was kneaded for one hour. To the thus obtained material, 122.2 g. of zinc oxide which has been made pasty with water was added and the resulting mixture was kneaded for one hour to form a homogeneous paste. The paste was dried at room temperature to 60° C. after being extruded through a nozzle with a diameter of 6 mm. The paste was made into the form of a plate of 5–6 mm. thick. The dried material was pulverized to a grain size of about 6 mm. and reduced for several hours with a mixture gas of CO and H$_2$ at 230°–250° C. under atmospheric pressure.

The following table shows a comparison between the results of methanol synthesis test carried out by use of the thus obtained catalyst and those of the conventional catalyst (A) prepared by dissolving copper oxide in an aqueous chromic acid solution and then adding zinc oxide thereto. (The catalyst A was prepared according to Bull. Chem. Soc., Japan, 33, 358–363 (1960).)

| Catalyst | Cu:Zn:Cr (Atomic ratio) | Synthesis conditions | | | Synthesis gas composition | | Amount of methanol produced (cc./hr./gm. catalyst) |
|---|---|---|---|---|---|---|---|
| | | Pressure gauge (kg./cm.$^2$) | Temperature (° C.) | Space velocity (l./hr.) | CO (percent) | H$_2$ (percent) | |
| Instant catalyst | 0.4:1.2:1.0 | 150 | 270 | 1×10$^4$ | 24 | 67 | 2.47 |
| Catalyst (A) | 0.33:1.25:1.0 | 150 | 270 | 1×10$^4$ | 24 | 68 | 1.56 |

From the above table, it is understood that the catalyst of the present invention is high in activity per catalyst unit weight as compared with the conventional catalyst.

*Example 2*

Results of test on the present catalyst comprising Cu, Zn and Cr at an atomic ratio of 0.4:1.8:1.0 are compared with those of the conventional catalysts (A), prepared by dissolving copper oxide in an aqueous chromic acid

| Catalyst | Cu:Zn:Cr (Atomic ratio) | Synthesis conditions | | | Synthesis gas composition | | Amount of methanol produced (cc./hr./gm. catalyst) |
|---|---|---|---|---|---|---|---|
| | | Pressure gauge (kg./cm.$^2$) | Temperature (° C.) | Space velocity (l./hr.) | CO (percent) | H$_2$ (percent) | |
| Instant catalyst | 0.4:1.8:1.0 | 150 | 270 | 1×10$^4$ | 25 | 66 | 2.50 |
| Catalyst (A) | 0.33:2.0:1.0 | 150 | 270 | 1×10$^4$ | 24 | 67 | 1.42 |
| Catalyst (B) | 0.55:2.0:1.0 | 150 | 270 | 1×10$^4$ | 25 | 66 | 0.81 | solution and then adding zinc oxide thereto, and (B), obtained by charging zinc oxide into an aqueous chromic acid solution and then adding copper oxide thereto, to give the table above. (The catalyst A was the same as in Example 1, and the catalyst B was prepared according to Japanese Patent 220,390 (1956).)

It is understood that the catalyst of the present invention is higher in catalyst activity per unit weight than any of the conventional catalysts.

What we claim is:

1. The process of manufacturing a Cu-Zn-Cr system catalyst for methanol synthesis, which comprises forming a homogeneous paste consisting essentially of basic cuprammonium chromate which has been decomposed at a temperature between 250° C. to 700° C., an aqueous solution of chromic acid and a substance selected from the group consisting of zinc oxide, zinc acetate and zinc hydroxide, drying said mixture to obtain a dried product, shaping said dried product, and reducing the thus shaped product at a temperature from 170° C. to 450° C.

2. The process as claimed in claim 1 where the zinc oxide is in powder form.

3. The process as claimed in claim 1 wherein the zinc oxide is in paste form.

4. The process as claimed in claim 1 wherein the shaped product is a pellet, the process further comprising crushing the dried and shaped product and shaping the thus crushed material.

5. The process as claimed in claim 1 wherein the reduction temperature of the shaped mixture is from 230° C. to 250° C.

References Cited by the Examiner

UNITED STATES PATENTS

| 1,746,782 | 2/1930 | Lazier | 252—468 XR |
| 1,746,783 | 2/1930 | Lazier | 260—449.5 |
| 1,809,978 | 6/1931 | Larson | 252—468 XR |
| 1,959,313 | 5/1934 | Vail | 252—468 |
| 2,014,883 | 9/1935 | Dodge | 260—449.5 |
| 2,275,152 | 3/1942 | Lazier | 252—468 XR |
| 2,512,653 | 6/1950 | Kapecki | 252—468 |
| 2,904,575 | 9/1959 | Peet | 260—449.5 |
| 2,964,551 | 12/1960 | Woolcock | 260—449.5 |

FOREIGN PATENTS

| 123,523 | 2/1959 | Russia. |

OSCAR R. VERTIZ, *Primary Examiner.*

MAURICE A. BRINDISI, *Examiner.*

G. T. OZAKI, *Assistant Examiner.*